United States Patent [19]

Bettoli

[11] 4,180,615

[45] Dec. 25, 1979

[54] VINYL TILE AND PRODUCTION THEREOF

[75] Inventor: Philip S. Bettoli, Martinsville, N.J.

[73] Assignee: GAF Corporation, New York, N.Y.

[21] Appl. No.: 907,726

[22] Filed: May 19, 1978

Related U.S. Application Data

[60] Continuation of Ser. No. 848,898, Nov. 7, 1977, abandoned, division of Ser. No. 347,480, Apr. 3, 1973, abandoned, which is a continuation-in-part of Ser. No. 215,197, Jan. 3, 1972, abandoned.

[51] Int. Cl.$^2$ .............................................. B05D 3/06
[52] U.S. Cl. .................................. 428/339; 427/54.1; 427/293; 428/425; 428/523
[58] Field of Search ............... 427/54, 293; 428/339, 428/425, 523

[56] References Cited

U.S. PATENT DOCUMENTS

| | | | |
|---|---|---|---|
| 3,442,730 | 5/1969 | Dietz | 156/71 |
| 3,770,602 | 11/1973 | D'Alelio | 204/159.15 |

FOREIGN PATENT DOCUMENTS

1003575  9/1965  United Kingdom .

*Primary Examiner*—Bernard D. Pianalto
*Attorney, Agent, or Firm*—Walter C. Kehm; Joshua J. Ward

[57] ABSTRACT

Vinyl floor or wall tile is surfaced with a clear, durable wear layer. The wear layer comprises urethane compound photo-polymerized from a fluid coating composition having a volatility of at least 2 percent and comprising at least 2 photo-polymerizable ethylenically unsaturated groups of the general structure:

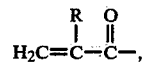

where R is either H or CH$_3$. The wear layer is applied to a continuous sheet of vinyl composition traveling at a rate of at least about 80 ft./min. at a temperature of at least about 110° F., and cured by exposure to ultra-violet radiation.

21 Claims, No Drawings

VINYL TILE AND PRODUCTION THEREOF

CROSS-REFERENCE TO RELATED APPLICATIONS

This is a continuation-in-part of co-pending application Ser. No. 848,898 filed Nov. 7, 1977, division of application Ser. No. 347,480 filed Apr. 3, 1973, both now abandoned, which in turn is a continuation-in-part of application Ser. No. 215,197 filed Jan. 3, 1972 and now abandoned.

BACKGROUND OF THE INVENTION

Wear layers previously employed on vinyl floor and wall tile have certain inherent deficiencies that render them unsuitable for general application. For example, thermoplastic wear layers lower the resistance of the tile to scorching from hot objects such as a burning cigarette. In addition, the solvent resistance of such coated tiles is generally relatively poor. Tiles having such coatings of adequate thickness thereon are also found to have serious dimensional stability problems in the form of undesirable curling of the edges of the tile in storage or service.

Polymerizable coatings that require conventional organic solvents are unsuited for vinyl floor tiles because the penetration of coating solvent into the vinyl base material tends to lower the resistance of the tile to indentation. Even after heat treatment, the tile contains a residual amount of solvent that adversely affects the flow and indentation properties of the finished tile in service.

Heat cured coatings have been found to induce curling problems in vinyl tile caused, at least in part, by the shrinkage of the surface wear layer during polymerization. Such problems are complicated by any lack of uniformity in coating thickness.

Electron beam, gamma radiation and x-ray treatment have also been proposed to initiate curing and to promote cross-linking of surface coatings on vinyl tile. Such irradiation techniques are not acceptable. Such methods tend to discolor the base surface and promote extremely rapid polymerization. The resulting coating shrinkage appears to place the tile surface under tension such as to cause undesired curling or cupping of the tile.

Vinyl tile as usually prepared contains a polyvinyl chloride resin or a copolymer of polyvinyl chloride and polyvinyl acetate. Stabilizers are usually incorporated in an amount ranging from about 0.3% to about 1.5% by weight of said base tile. While such tile is relatively free of the curling difficulties encountered in the various attempts to apply a clear wear layer to the tile, such tile must be cleaned and waxed at regular intervals to preserve its appearance in use.

SUMMARY OF THE INVENTION

The improved vinyl tile of the present invention comprises:

(a) thermoplastic base tile comprising filler, vinyl chloride polymer and plasticizer; and (b) a clear, durable wear layer adhering to the surface of said base tile and having a thickness of from about 1 to about 5 mils. The wear layer comprises urethane compound photopolymerized by an exposure to ultraviolet light at from about 110° F. to about 220° F. for from about 0.2 I to about 15 seconds. The wear layer is photopolymerized from a fluid coating composition having a volatility of less than about 2 percent and comprising urethane compound having at least 2 photo-polymerizable ethylenically unsaturated groups of the general structure:

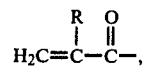

where R is either H or $CH_3$.

The process of the invention comprises:

(a) calendering a uniform mix comprising filler, vinyl chloride polymer and plasticizer to form a continuous vinyl sheet having a thickness of from about 1/16" to about ⅛", said continuous sheet being discharged from the calendering zone at a travel rate of at least about 80 ft./min.;

(b) coating the thus-formed continuous vinyl sheet traveling essentially at said travel rate with a layer between about 1 and about 5 mils thick of a substantially solvent free fluid coating composition having a volatility of less than about 2 percent and comprising urethane compound having at least two photo-polymerizable ethylenically unsaturated groups of the general structure:

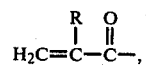

where R is either H or $CH_3$, said layer of coating composition being capable of curing upon exposure to ultraviolet light to form a hard, clear layer adherent to said vinyl sheet;

(c) exposing the thus-coated sheet traveling essentially at said rate of at least about 80 ft./min. to ultraviolet light having wavelengths within the range of from about 2500 Å to about 4000 Å at a temperature of from about 110° F. to about 220° F., the radiation intensity level being sufficient to initiate the desired curing of the coating within an ultraviolet exposure time of from about 0.2 sec. to about 15 sec.; and (d) passing the thus-treated sheet traveling essentially at said rate to a cutting zone and therein cutting the thus coated and treated sheet at a temperature of not less than about 120° F. to form individual tiles having a clear wear layer thereon.

DETAILED DESCRIPTION OF THE INVENTION

In conventional production of vinyl floor or wall tiles, a mixture of filler, vinyl chloride polymer, plasticizer, and usually pigment and light and heat stabilizers is blended to a uniform mastic composition in a high intensity mixer at a temperature generally in the range of from about 280° F. to about 320° F. The amount of stabilizer material employed is generally from about 0.3% to about 1.5% by weight of said mix.

The uniform mix is then consolidated, as by milling on a two-roll mill, to form a pad of mix material. The thickness of this pad is generally from about ¾" to about 2", although pads having a thickness outside this range can also be prepared and utilized. As some slight cooling will generally occur at this stage, the temperature of the pad will generally be on the order of from about 260° F. to about 290° F.

The pad is then reduced in thickness to approximately from about 1/16" to about ⅛" upon passing through two sets of calender rolls. In the first set of rolls, the pad is reduced to about 1/6" at a temperature of from about 240° F. to about 260° F. If desired, opaque and/or clear chip surface mottles are added to the pad between the first and second calender rolls. In the second set of calender rolls, the pad is further reduced to said 1/16"-¼" range, being discharged from the calendering zone as a continuous sheet, preferably at a temperature of from about 160° F. to about 180° F. The rate of discharge of the continuous sheet, in commercial production of vinyl asbestos tile, is generally at least about 80 ft./min., typically about 125 ft./min. Considerably higher sheet travel rates, up to about 175 ft./min., or even to about 200 ft./min. or above, are also feasible in commercial operations, with, of course, correspondingly increased production of individual tiles.

The vinyl sheet used in the product and process of the present invention can be formed in the above manner, or by any other known technique, as by consolidating hot chips of the desired composition.

Suitable vinyl chloride polymer for use in product and process of the invention includes any of those vinyl chloride polymers normally used in the production of floor or wall tiles. Vinyl chloride homopolymers and vinyl chloride/vinyl acetate copolymers and mixtures thereof are for instance suitable. Where vinyl chloride/vinyl acetate copolymers are used, copolymers having a ratio of vinyl chloride units between about 4 to 1 and about 10 to 1 are preferred. Other suitable vinyl chloride polymers include for instance vinyl chloride copolymerized with such comonomers as vinylidene chloride, vinyl propionate, vinyl butyrate or the acrylates or methacrylates. Other resins such as hydrocarbon resins and chlorinated hydrocarbon resins, especially polyethylene and chlorinated polyethylene, as well as various extender resins, may be included in the manner well known in the art.

Conventional plasticizers such as diisononyl phthalate, butylbenzylphthalate, tricresylphosphate, 2,2,4-trimethyl-1,3-pentanediol isobutyrate benzoate, epoxidized soy bean oil, etc. may be used. Plasticizers are commonly used in amounts between about 25 and about 50 wt% based on resin. Suitable stabilizers include such conventional stabilizers as barium, calcium, zinc or cadmium salts of organic acids, or dicyandiamide if asbestos is present, and are frequently used in amounts between about 4 and about 8 wt% based on resin. Suitable fillers for the vinyl base include conventional fillers such as asbestos, limestone, talc, organic fibers, etc. For tile base, such fillers are frequently used in amounts ranging from about 50 to about 80 wt% of the tile base. In addition to the ingredients mentioned above, tile bases used in the invention may include other conventional ingredients such as pigments, chips to produce a mottled surface appearance, etc.

The vinyl sheet formed as described above can be further processed as a plain sheet or, if desired, can be embossed or valley printed or otherwise printed with a decorative design with a texture roll. The temperature of the sheet following embossing or valley printing will generally be about 170° F. to about 200° F. or more.

The continuous sheet, embossed, valley printed, otherwise printed or plain is coated with a fluid coating composition capable of curing upon exposure to ultraviolet light to form a clear, durable wear layer on the vinyl base. The coating will have a thickness generally of from about 1 to about 5 mils, preferably about 3 mils. For the purposes of the present invention, the composition of the coating will advantageously contain essentially 100% of active ingredients. That is, the coating composition will preferably contain essentially no inert solvent, thereby avoiding the problems of solvent penetration into the base tile, as well as operational problems associated with solvent application and removal in the environment of a hot vinyl sheet. It is within the scope of the invention, however, to incorporate a very small amount of a suitable solvent to thin the photo-polymerizable material to be coated on the vinyl sheet. Such small amounts, up to about 5% by weight of the coating composition, can be tolerated for this purpose providing curing takes place very shortly after application.

The coating of the warm vinyl sheet following calendering and embossing or printing, if employed, will generally take place at a sheet temperature of from about 110° F. to about 210° F. The sheet temperature will ordinarily exceed 130° F. and will, in fact, generally be at least 170° F. for embossed sheets, but lower if embossing is omitted. The coating composition can be applied to the surface of the warm vinyl sheet by any conventional coating means, such as by suitable roll, spray, curtain or extrusion coating equipment.

The vinyl sheet, having the coating composition thereon, travels at the indicated rate of at least about 80 ft./min. immediately into an irradiation zone in which the coating is exposed to ultraviolet light having wavelengths within the range of from about 2500 Å to about 4000 Å. The temperature of the sheet at this stage will be approximately the same as in the coating stage, i.e., about 110° F. to about 220° F., generally from about 120° F. to about 180° F. It should be noted that ultraviolet-initiated curing of coatings such as those employed in the present invention commonly results in an undesirable tacky surface when the irradiation is carried out in the presence of an atmosphere containing more than extremely low levels of oxygen. The oxygen, e.g., at more than about 300 parts per million (ppm), readily reacts with free radicals, terminating further curing and preventing full development of the desired hardness. The irradiation of the coated vinyl sheet of the invention therefore, is commonly carried out in an inert, non-oxidizing atmosphere, e.g. a nitrogen gas atmosphere containing less than about 1,000 ppm, preferably less than about 500 ppm, oxygen. It should be understood, however, that it is within the scope of this preferred embodiment of the invention to partially cure the coating by exposure to ultraviolet light in an atmosphere containing substantially greater quantities of oxygen; e.g., in excess of about 5,000 ppm oxygen, so long as the surface of the coating is cured in a substantially inert non-oxidizing atmosphere rather than an oxidizing atmosphere.

A variety of commercially available ultraviolet radiation sources can be employed to supply the necessary ultraviolet radiation to cure the clear wear layer on the vinyl base material. Examples of suitable sources of ultraviolet energy include, but are not necessarily limited to, arc-jet plasmas of argon and nitrogen, carbon arc or resonance lamps, medium or high pressure quartz tube mercury lamps etc. Quartz tube mercury lamps are preferred. The specific wavelengths of light that are most effective will vary somewhat depending upon the particular coating composition employed in the practice of the invention and the particular type and amount of photosensitizer incorporated in said coating. In general, however, wavelengths between about 2500 and about 4000 angstroms are suitable for initiating the desired coating cure. Suitable ultraviolet light sources are perferably capable of delivering between about 200 and about 1,000 watts per square foot of ultraviolet radiation to the coated surface to effect a satisfactory cure of the coating.

The intensity level of the energy output of the radiation source and the range of the light spectrum, both ultraviolet and visible, covered by the source are both subject to considerable variation from one particular commercially available source to another. Only a portion of the total light energy of most ultraviolet lamps is generally useful in the initiation of the cure of the fluid coatings applied to a vinyl sheet in the practice of the invention. For example, only about 8 percent of the spectrum from the argon plasma arc is believed effective. Nevertheless, exposure for only about two-tenths of a second to an argon plasma arc lamp that provides an intensity of 7.5 kilowatt per square foot is sufficient to completely cure a coating approximately 3 mils thick. On the other hand, about twenty percent of the spectrum of a high pressure mercury lamp is believed in the proper range for initiation of the coating cure. Exposure for less than about ten seconds, frequently for less than about 2 seconds, to a 2.4 kilowatt per square foot mercury assembly will generally be adequate to achieve curing.

It will also be understood that particular exposure time limits will apply depending upon the particular capabilities of the irradiation source applied in a given application with respect to a particular coating composition. When employing plasma arc lamps of the curing capability indicated, for example, an exposure time of more than several seconds would be avoided in order to avoid baking the vinyl asbestos base composition to undesirably high temperatures at which degradation occurs or that, in any event, might require additional cooling or have other disadvantages. With high or medium pressure mercury lamps of the indicated capacity, on the other hand, an exposure time of less than a second, which might be suitable for a plasma arc, would be insufficient to initiate the desired cure of most coatings. While the distance between the ultraviolet source and the coated sheet is not critical and will vary depending on the characteristics of the particular system employed, such distances may range from about 1" to about 12" or more, preferably from about 1" to about 3" for general convenience.

It is generally desired that the vinyl sheet pass immediately from the coating zone of the production line to the irradiation zone thereof in order to minimize any penetration of the coating composition into the base material. Time between coating and curing is preferably maintained less than about 10 seconds.

Upon leaving the irradiation zone, the continuous sheet travels to a cutting zone at the indicated rate of at least about 80 ft./min., preferably between about 125 and about 175 ft./min. Coating and treating the entire vinyl sheet on the production line prior to die cutting the individual tiles is advantageous in that the edges of the resulting individual tiles are thus clean and square. Coating individual tiles, on the other hand, can result in slight edge beading of the coating that prevents close butting of the individual tile units when applied to a floor.

The coated sheet of vinyl material will be warm when it passes from the irradiation zone to the cutting zone on the production line. The sheet temperature should and ordinarily will be above about 120° F. at the time of cutting. Preferably the cutting temperature should be at least about 130° F.

Upon cutting of the sheet, certain relaxation forces are believed to operate with respect to the individual tiles. If these forces operate over variable periods of time and under somewhat different temperature conditions, slight variations will often be noted in the dimensions of the individual tiles, rendering difficult their desired placement and appearance in flooring applications. Such dimensional variations are minimized by cutting the tiles while warm as in the practice of the invention. Size variations due to the indicated forces are thus found to occur at a much more uniform rate, so that the cooled and packaged individual tiles will have and retain a greater degree of size uniformity than is achieved when the tiles are cut from a cool sheet. In addition, it is believed that the shrinkage of the warm vinyl tile upon cooling tends to compensate for any volume reduction that takes place in the coating upon curing so as to further minimize the curling forces that can produce dimensional instability and render the tiles unacceptable in subsequent storage and use. This is a further advantage of the overall process of the invention in which the coating, irradiation and cutting operations all occur with respect to the warm vinyl sheet on a high speed production line prior to the cooling of the individual tiles for subsequent packaging, storage and use.

The conventional sheet cutting operations, the portion of the sheet being cut is momentarily brought to rest in the cutting zone. In order to avoid any interruption in the essentially high speed travel of the continuous sheet at the indicated rates, a sheet loop of variable amplitude is provided in advance of the cutting zone in the manner well known in the art. As indicated above, it is within the scope of the invention, although not generally preferred, to provide momentary stoppage of the continuous sheet at other points, as in the irradiation zone, as by such sheet loops of variable amplitude. The continuous vinyl sheet nevertheless travels essentially at the indicated rate from the time it leaves the calendering zone until the time it is cut into individual tiles at the cutting zone.

The coating compositions employed for the clear water layer are preferably water white, non-yellowing with age and extremely abrasion, mar and scratch resistant upon curing or exposure to ultraviolet radiation during high speed production of vinyl tiles. The clear wear layer also advantageously has superior resistance to scorching from hot objects and superior solvent, staining and soiling resistance as compared to ordinary vinyl asbestos tile. It wil be appreciated that the tile of the present invention will not necessarily have enhanced properties, as compared with conventional tile, with respect to every feature upon which said tile is ordinarily evaluated. By terms such as "an advantageous combination of properties", as used herein, is meant that, on an overall basis, the tile of the invention will have properties that, in combination, are superior or highly advantageous as compared with conventional tile not having the subject wear layer thereon. The particular combination of properties obtained will, of course, vary depending upon a number of factors, including but not necessarily limited to the particular source of ultraviolet radiation employed, the time and degree of radiation, the temperature of the vinyl sheet, the nature of the photo-polymerizable compound or compounds employed, the nature and quantities of other ingredients, such as photoinitiators and monomers employed therewith, the particular distance employed between the radiation source and the moving sheet, and the like. In general, however, the tile of the present invention will have enhanced abrasion and scratch resistance characteristics as compared with conventional, untreated tile. The conventional tile is normally cleaned and waxed at frequent intervals during use, the factory waxing thereof serving primarily to prevent blocking of the tile while stacked in cartons during transport and storage. The tile of the present invention, among its advantageous features, obviates the necessity for such frequent waxing and significantly reduces or minimizes the efforts required in cleaning and otherwise maintaining the tile in service.

A highly significant feature of the present invention is that the advantageous combination of enhanced properties is obtained without causing unacceptable curing as heretofore encountered in efforts to apply wear layers to vinyl tile. The dimensional stability characteristics associated with conventional vinyl tile are thus preserved in the surfaced tiles of the present invention. It should be noted that the application of a wear layer as a feature of the process for producing the tile of the invention does not ordinarily assist in the meeting of the applicable curling standards, i.e., conventional tile having unacceptable curling will not ordinarily be converted to acceptable tile, from a curling viewpoint, by the process of the invention. Of significance from the point of view of the present invention, however, is the fact that the dimensional stability characteristics of the tile prepared in accordance with the invention are comparable to those of the untreated conventional tile, thereby providing the requisit resistance to curling during storage and use.

Coating compositions used for the product and process of the invention are urethane-type compounds having two or more photo-polymerizable ethylenically unsaturated groups of the general structure:

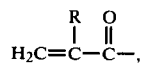

where R is either H or CH$_3$.

Such urethane-type compounds have the general molecular configuration:

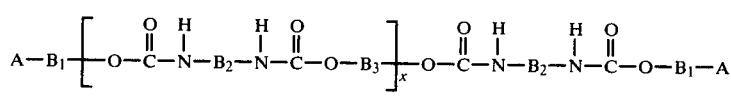

wherein A is either

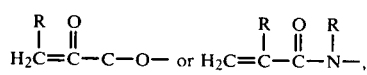

R being H or CH$_3$; x is 0, 1 or 2; and B$_1$, B$_2$ and B$_3$ are each taken from the group consisting of an alkylene of the type

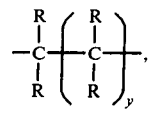

where R is H, CH$_3$ or C$_2$H$_5$ and y is either 0 to 1 to 6, cycloalkylene of the type

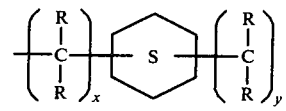

wherein R is H, CH$_3$ or C$_2$H$_5$, x=0 or 1 or 2 and y=0 or 1 or 2, oxyalkylene of the type

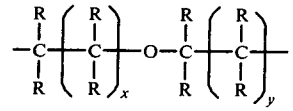

wherein R is H, CH$_3$ or C$_2$H$_5$, and x or y or both either 1, 2 or 3;

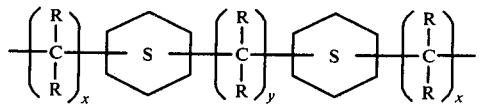

where R is H, CH$_3$ or C$_2$H$_5$, y is 0, 1, 2 or 3, and x is 0, 1 or 2; and

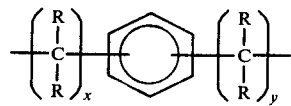

wherein R is H, CH$_3$ or C$_2$H$_5$, and x y are both either 1 and 2. It will be appreciated that x and y may constitute a mixture of the values indicated herein.

Such coatings having urethane linkages therein may be prepared by conventional methods well known in the art. As the coating compositions per se are not the point of novelty of the present invention, details concerning the preparation of such coatings are not included herein, the preparation of such compounds generally being within the skill of the art. With regard to coatings of the type indicated above, however, it might be noted that one mole of dihydric alcohol may be reacted with two moles of disocyanate, followed by reaction of the product thereof with two moles of hydroxyethylacrylate. This well known operation is facilitated by the use of a basic catalyst, such as stannous octoate, dibutyl tin dilaurate or the like, in amounts of generally from about 0.05% to about 0.1% by weight of the total system, the operation being complete in a few hours at reaction temperatures of on the order of 50° C.

as is well known in the art. Illustrated examples of said photo-polymerizable compounds of the type indicated are:

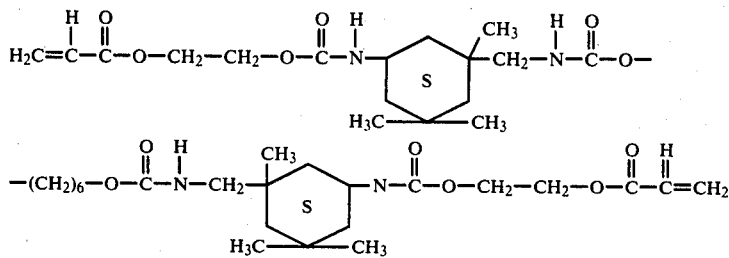

AND

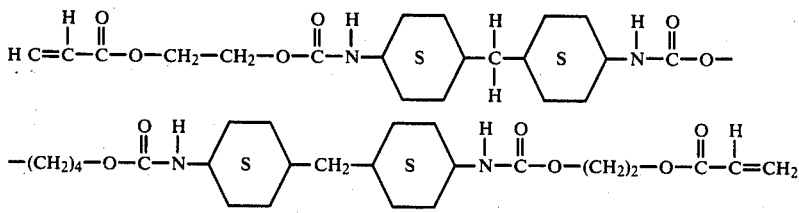

It will also be appreciated that compounds of a tri-functional photo-polymerizable nature can readily be produced and would be of interest with respect to the present invention.

It will be appreciated that the viscosity of the UV curable urethane coating described above for use in connection with the process and product of the invention may vary widely depending upon the particular coating technique employed. For instance, in a preferred embodiment of the invention in which the coating is applied to the vinyl sheet by conventional roll coating techniques, the viscosity of the coating is preferably between about 1,000 and about 3,000 centiposes (cp) at 77° F. Roll coating is a preferred technique for applying the urethane coating. Other techniques can be used but frequently have disadvantages. Curtain coaters give excessive coating thickness below line speeds of about 300 feet per minute. Spray coating can be used but is generally considered unsatisfactory because of the dangers of skin irritation due to the nature of the materials in the coating.

In order to achieve satisfactory continuous operation over substantial periods of time, it is essential that the percent volatility of the urethane coating as applied to the vinyl sheet in accordance with the invention be less than about 2 percent, preferably less than about 1 percent, such as between about 0.05 and about 1.0 percent. As used herein, the term "percent volatility" means the weight percent (wt %) of the total fluid coating which is removed from the coating mixture by heating in an oven with full air circulation for 5 minutes at 82° C. If the volatility of the coating composition exceeds the limits stated herein, it has been found that continuous operation of the process of the invention for more than an hour or two is not possible. If the volatility does not exceed about 1.0 percent, continuous operation may be sustained almost indefinitely. It has been found, for instance, that the quartz tubes of UV lamps tend to blacken after an hour or so of continuous operation if volatility of the coating composition is above the levels specified herein. This results in inadequate curing of the urethane coating and a resulting tile product having a coating with inadequate resistance to scratching.

In accordance with customary practice, the coating compositions applied to the vinyl sheet will advantageously contain a conventional amount of known photo-sensitizers. Such photo-sensitizers or photoinitiators absorb ultraviolet light resulting in the formation of free radicals capable of initiating polymerization. Illustrative of such photosensitizers are sulfur-containing compounds, such as dithiocarbamates, trithiocarbonates, thiuram compounds, thiazoles and xanthates, as well as aromatic disulphides, -phenyl-acetophenone derivatives, e.g., benzil and benzoin, and benzoin ethers, such as benzoin-methyl, -ethyl, -n-propyl and -isopropyl ethers. Such photo-sensitizers are generally employed in amounts from about 0.5% to about 5%, commonly from about 1% to about 2% by weight of the coating composition. The amount and type of photo-sensitizers, free radical generating under ultraviolet radiation, employed in the practice of the invention will be selected, of course, to be compatible with the particular polymeric system utilized. It will also be appreciated that the particular photo-sensitizers employed in any given application must also be sensitive to the wavelengths and energy level of the ultraviolet light source with which it is employed in the given application in order to initiate the desired reaction and thus effect the curing of the coating on the vinyl asbestos sheet.

Additional conventional ingredients of reactive coatings which may be present in the coatings of the present invention include pigments, fillers, dyes, thermoplastic additives such as cellulose acetate butyrate, plasticizers, synthetic resins, heat and light stabilizers, filler such as carbon black, glass fibers, silica, etc.

The coating composition of the invention will also preferably contain one or more mono or di-functional vinyl monomers copolymerizable under ultraviolet radiation with the above-indicated urethane compounds used in the coating composition. The monomer functions to reduce the viscosity of the urethane compound that may otherwise be too viscous to apply to the continuous sheet of vinyl material passing the coating zone of the production line. The monomers are preferably of a suitably low vapor pressure to prevent evaporative loss during application and curing. The monomers must also be sufficiently stable to prevent premature gelation or reaction with the urethane compounds employed in the coating composition prior to exposure of the coating to ultraviolet light in the irradiation zone of the vinyl tile producing operations of the invention. If desired, small amounts of polymerization inhibitors may be added to the coating for this purpose. Illustrative of the numerous monofunctional monomers that are suitable for use in the invention are acrylates or methacrylates having the formula:

wherein $R_1$ is H or $CH_3$ and $R_2$ is an alkyl or cycloalkyl group having 6 to 18 carbon atoms, a phenoxyalkyl group of 6 to 18 carbon atoms, or a hydroxyalkyl group. In this regard, it will be appreciated that certain limited amounts of hydrophilic monomers, such as hydroxyethyl acrylate or N-vinyl pyrrolidone, may be present in the overall coating composition without adversely affecting the properties of the cured wear layer coating so long as the amount is not such as to introduce undesired water sensitivity to the coating. Other representative examples of the numerous mono-functional monomers of the type indicated that are suitable for use in the invention are lauryl methacrylate, isodecyl acrylate, cyclohexyl acrylate and 2-phenoxyethyl acrylate. Styrene may be employed, but is generally not preferred because of a potential to discolor upon long time exposure to light in service. Suitable difunctional monomers include, for instance, hexanediol diacrylate, butanediol diacrylate, diethyleneglycol diacrylate, triethyleneglycol diacrylate, tetraethylenglycol diacrylate, etc. Small amounts of styrene or vinyl toluene can be tolerated, however, as can small amounts, generally from about 1-2% up to about 5% by weight, of other monomeric materials, e.g., trimethylolpropane triacrylate.

The amount of monomer employed for the indicated purpose will vary depending on the characteristics of the urethane compound of the coating. While the monomer content will generally range from about 15% up to about 45% by weight, or higher based on the total weight of the urethane compound and monomer, the monomer content will often be from about 30% to about 35% by weight, although smaller amounts can be used where sufficient for viscosity reduction.

The following examples are intended to illustrate certain embodiments of the invention without limiting the scope thereof

EXAMPLE 1

In the practice of the invention, a typical vinyl sheet composition may consist of the following:

| | Wt % |
|---|---|
| Asbestos fiber | 18% |
| Vinyl chloride copolymer (e.g., 86% polyvinyl chloride and | |

| | Wt % |
|---|---|
| 14% vinyl acetate) | 17% |
| Butyl benzyl phthalate plasticizer (BBP) | 5.5% |
| 200 mesh limestone | 55% |
| TiO$_2$ pigment | 3% |
| Stabilizers 1% barium cadmium laurate 0.5% epoxidized soybean oil | 1.5% |

The mix may be processed in a Banbury unit until fluxed to a uniform mastic composition at about 290° F. This material may then be processed on a two-roll mill from which it is removed as a pad approximately 1" thick. This pad can then be reduced in thickness to approximately 1/16"–1/8" by passing it through one/or more sets of calendar rolls. If desired, the resulting continuous vinyl asbestos sheet may be embossed or valley printed with a texture roll while still hot. The temperature of the continuous sheet may be about 185° F. at this point, the sheet traveling at a speed of about 125 ft./min. As the sheet passes a coating zone, a clear coating composition capable of curing upon exposure to ultraviolet light, can be applied by spray to a thickness of 2 mils.

The coating can have a formulation of about 61 wt % of a urethanoethyl acrylate having the formula:

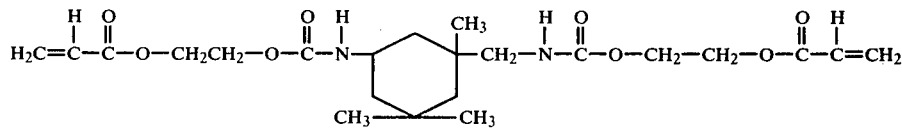

about 32 wt % hexanedioldiacrylate, about 6 wt % N-vinyl pyrrolidone and about 1 part by weight benzoin methyl ether.

The continuous sheet may then be passed immediately at the indicated travel speeds to an irradiation zone in which a nitrogen atmosphere is maintained. High pressure mercury lamps providing a total of about 600 watts per square foot of ultraviolet radiation to the coated surface of the sheet. Upon leaving the irradiation zone after approximately 10 seconds, the sheet, cooled to about 130° F., passes to the cutting zone where it is cut into individual tiles.

EXAMPLE 2

To evaluate the importance of volatility of UV curable coatings used in the invention, vinyl floor tile was manufactured in accordance with the invention using three different urethane coatings of different volatilities. Each of the urethane coating materials applied had the same cure speed and other coating characteristics and each contained about 65 wt % oligomer and about 35 wt % diluent monomer. Viscosity of the coatings as applied was within the range of about 1200 to about 1800 cp at 25° C.

The coating was, in each case, applied at a sheet temperature of 150°–160° F. Coating temperature in the roll coater used to apply coating was 80° F. Curing was accomplished within 2 seconds at a 100 ft./min. travel speed by use of medium pressure mercury vapor lamps providing about 500 watts of ultraviolet radiation per square foot of coated surface. An inert nitrogen atmosphere containing less than 500 ppm oxygen was provided.

A continuous run as described above was carried out using each of the coating compositions described in this example to determine how long the operation could be run as a continuous operation while still obtaining satisfactory cure. To evaluate the acceptability of the curing of the coating, samples of tile manufactured after varying periods of continuous operation of the process were subjected to the scratch test described herein. The length of continuous run without cure problems for each of the coatings tested is reported in Table I below.

The scratch test used to determine acceptable cure of coatings applied in accordance with the invention is distinct from conventional tests for prediction of wear layer performance. The scratch tests employed herein used a tongue depresser (Puritan Company's No. 705 or equivalent) which was held with the index finger on top and about half way down the length of the depressor. The depressor was held at an angle of about 45° to a cured tile and rubbed back and forth several times with maximum pressure possible without breaking the depressor stick. With a properly cured tile there is no evidence of scratch or at most only a very faint mark when using this test. If the coating layer is completely penetrated in this test, cure is considered unsatisfactory.

Volatility of coatings as reported herein was determined by measuring the volatiles removed from 2 grams of the coating composition in a circulating oven maintained at a temperature of 82° C. plus or minus 1° C. with full air circulation for exactly 5 minutes. The oven used for these tests was a Blue-M model POM-203C. Figures reported herein are the average of three separate values measured for each coating. Coatings A, B and C tested in this example had percent volatilities as reported in Table 1 below.

Table 1 also indicates the length of continuous run obtainable with each of the coatings A, B and C before cure problems were encountered as indicated by failure of the finished tiles to pass the scratch test described above.

Table I

| Coating Identification | Volatility | Length of Continuous Run Without Cure Problems |
| --- | --- | --- |
| A | 4.9% | 1.0 hours |
| B | 2.3% | 1.5 hours |
| C | 0.8% | 7+ hours |

EXAMPLE 3

To evaluate the usefulness of various types of UV curable coatings in connection with the invention, coatings identified for this example as coating compositions A-G were formulated, coated onto floor tiles and cured by exposure to ultraviolet radiation. The cured tiles were then tested for stain resistance and color as described herein.

The UV curable coatings tested as described in this example had the compositions shown in Table II below. The acrylated urethane oligomer used in Composition A was a hexanediol/isophorone diisocyanate/hydroxyethylacrylate based oligomer. Composition B used an acrylated polyester material and Compositions C-G used various commercially available acrylated epoxy compositions. All of the compositions used the same monomer diluents, i.e. 1.6-hexanediol diacrylate and N-vinyl pryolidone. Compositions A-G and the oligomers on which they were based had the viscosities shown in Table III.

For these tests vinyl sheet made as described in Example I above, but uncoated was cut into 12" square tiles which were then coated with the particular compositions being tested to a thickness of 0.002-0.003". The freshly coated tiles were then immediately passed through a continuous UV curing step at a speed of 125 feet per minute during which they were subjected to UV radiation from the same type of UV quartz tube mercury lamps described above in connection with Example I. Coating temperature was about 77° F. Following curing of the coating and cooling, the tiles were subjected to physical testing to determine color and stain resistance with the results shown in Table III below. The tile samples were also tested for gloss retention, Taber abrasion, light stability, curl tendency, solvent resistance and tensile hardness. With the exception of poor light stability exhibited by compositions C and D and poor curl tendency exhibited by Composition C, these latter properties were acceptable for all of the samples tested.

Stain resistance as reported in Table III below was measured by placing a drop of DuPont yellow stain oil on the surface of the tile being tested and then wiping off the stain oil one half hour later with a damp rag. Staining was evaluated with a rating of 0 indicating no visible stain and a rating of 10 indicating a bright yellow stain. Color was evaluated by visual observation.

TABLE II

| | COMPOSITIONS OF UV CURABLE COATINGS | | | | | | |
| --- | --- | --- | --- | --- | --- | --- | --- |
| | Weight % (Approximate) | | | | | | |
| Materials | A Weight % | B Weight % | C Weight % | D Weight % | E Weight % | F Weight % | G Weight % |
| Acrylated Urethane | 66.19 | — | — | — | — | — | — |
| Acrylated Polyester | — | 75 | — | — | — | — | — |
| Acrylated Epoxy | — | — | 75 | — | — | — | — |
| Acrylated Epoxy | — | — | — | 75 | — | — | — |
| Acrylated Epoxy | — | — | — | — | 75 | — | — |
| Acrylated Epoxy | — | — | — | — | — | 75 | — |
| Acrylated Epoxy | — | — | — | — | — | — | 75 |
| 1,6 Hexandiol Diacrylate | 26.19 | 19.8 | 19.8 | 19.4 | 19.8 | 19.8 | 19.8 |
| N-Vinyl Pyrrolidone | 5.1 | 3.7 | 3.7 | 3.7 | 3.7 | 3.7 | 3.7 |
| Irgacure 651 | 1.0 | 1.0 | 1.0 | 1.0 | 1.0 | 1.0 | 1.0 |
| DC 193 | 0.50 | 0.5 | 0.5 | 0.5 | 0.5 | 0.5 | 0.5 |
| Phenothiazine | 0.025 | 0.025 | 0.025 | 0.025 | 0.025 | 0.025 | 0.025 |

TABLE III

VISCOSITIES OF UV CURABLE COATINGS AND PHYSICAL PROPERTIES OF DIOLS COATED THEREWITH

|  | A (Urethane Acrylate) | B (Polyester Acrylate) | C (Epoxy Acrylate) | D (Epoxy Acrylate) | E (Epoxy Acrylate) | F (Epoxy Acrylate) | G (Epoxy Acrylate) |
|---|---|---|---|---|---|---|---|
| Viscosity of Oligomer (77° F.) | — | — | 1680 | 78,000 | 236,000 | 770,000 | 1,240,000 |
| Viscosity of Coating (77° F.) | 2900 | 2460 | 240 | 2020 | 3060 | 4600 | 8400 |
| Stain Resistance (Yellow stain oil) | 1 | 7 | 0 | 0 | 0 | 0 | 0 |
| Color | Clear | Clear | Pale Yellow | Pale Yellow | Pale Yellow | Pale Yellow | |

As can be seen from Table III, the only coating composition which proved satisfactory from a standpoint of both stain resistance and color was Composition A which was in accordance with the invention. Composition B was unsatisfactory as to stain resistance while Compositions C-G showed a pale yellow color in the UV cured wear layer.

Composition A was cured at a line speed of 300 ft per minute. Composition B was cured at a line speed of 50 ft per minute and Compositions C-G were cured at a line speed of 200 ft per minute. These represented the maximum speeds at which satisfactory results could be obtained for these compositions. The ability to cure at an extremely high travel rate is a further advantage of Composition A over the other compositions tested.

While the invention has been described above with respect to certain embodiments thereof, it will be appreciated that various changes and modifications may be made without departing from the spirit or scope of the invention.

What is claimed is:

1. A continuous process for producing an improved vinyl tile comprising:
   (a) calendering a uniform mix comprising filler, vinyl chloride polymer and plasticizer to form a continuous vinyl sheet having a thickness of from about 1/16" to about ⅛", said continuous sheet being discharged from the calendering zone at a travel rate of at least about 80 ft./min.;
   (b) coating the thus-formed continuous vinyl sheet traveling essentially at said travel rate with a layer between about 1 and about 5 mils thick of a substantially solvent free fluid coating composition having a volatility of less than about 2 percent and comprising urethane compound having at least two photo-polymerizable ethylenically unsaturated groups of the general structure:

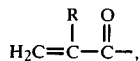

where R is either H or CH$_3$, said layer of coating composition being capable of curing upon exposure to ultraviolet light to form a hard, clear layer adherent to said vinyl sheet;
   (c) exposing the thus-coated sheet traveling essentially at said rate of at least about 80 ft/min. to ultraviolet light having wavelengths within the range of from about 2500 Å to about 4000 Å at a temperature of from about 110° F. to about 220° F., the radiation intensity level being sufficient to initiate the desired curing of the coating within an ultraviolet exposure time of from about 0.2 sec. to about 15 sec. and
   (d) passing the thus-treated sheet traveling essentially at said rate to a cutting zone and therein cutting the thus-coated and treated sheet at a temperature of not less than about 120° F. to form individual tiles having a clear wear layer thereon.

2. The process of claim 1 in which said continuous sheet discharged from the calendering zone and thereafter coated and irradiation-treated travels at a rate of from about 125 ft./min. to about 175 ft./min.

3. The process of claim 2 in which the sheet is cut into individual tiles at not less than about 130° F. and the ultraviolet exposure temperature is between about 130° and about 180° F.

4. The process of claim 1 in which said fluid coating composition contains a photosensitizer and vinyl monomer copolymerizable under ultraviolet radiation with said urethane compound, said vinyl monomer being sufficiently stable to prevent gelation with said urethane compound prior to exposure to said ultraviolet radiation, said vinyl monomer being present in an amount within the range of from about 15% to about 60% by weight based on the total weight of said urethane compound and said vinyl monomer and in which said urethane compound has the general molecular configuration:

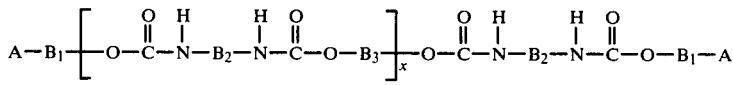

wherein A is either

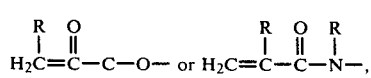

R being H or CH$_3$; x is 0, 1 or 2; and B$_1$, B$_2$ and B$_3$ are each taken from the group consisting of an alkylene of the type

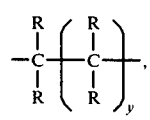

where R is H, CH$_3$ or C$_2$H$_5$ and y is either 0 to 1 to 6, cycloalkylene of the type

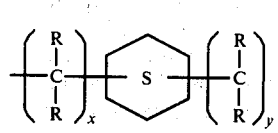

wherein R is H, CH$_3$ or C$_2$H$_5$, x=0 or 1 or 2 and y=0 or 1 or 2, oxylalkylene of the type

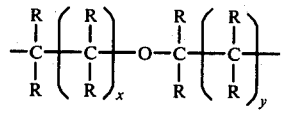

wherein R is H, CH$_3$ or C$_2$H$_5$, and x or y or both either 1, 2 or 3;

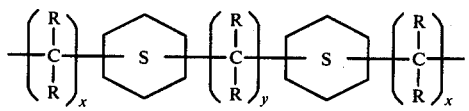

where R is H, CH$_3$ or C$_2$H$_5$, y is 0, 1 or 3, and x is 0, 1 or 2; and

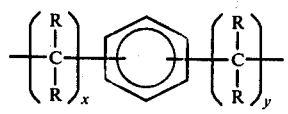

wherein R is H, CH$_3$ or C$_2$H$_5$, and x y are both either 1 or 2.

5. The process of claim 4 in which the vinyl chloride polymer comprises vinyl chloride/vinyl acetate copolymer having a ratio of vinyl chloride to vinyl acetate units between about 4 to 1 and about 10 to 1.

6. An improved vinyl tile comprising:
(a) thermoplastic base tile comprising filler, vinyl chloride, polymer and plasticizer; and
(b) a clear, durable wear layer adhering to the surface of said base tile and having a thickness of from about 1 to about 5 mils, said wear layer comprising urethane compound photo-polymerized by an exposure to ultraviolet light at from about 110° F. to about 220° F. for from about 0.2 to about 15 sec., said wear layer being photo-polymerized from a fluid coating composition having a volatility of less than about 2 percent and comprising urethane compound having at least two photo-polymerizable ethylenically unsaturated groups of the general structure:

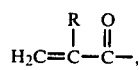

where R is either H or CH$_3$.

7. The composition of claim 6 in which said wear layer includes a photosensitizer and vinyl monomer copolymerized with said urethane compound, said vinyl monomer comprising from about 15% to about 60% by weight of said product based on the total weight of said urethane compound and said vinyl monomer and in which said urethane compound has the general molecular configuration:

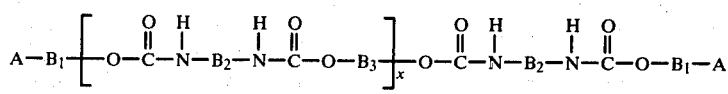

wherein A is either

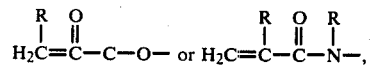

R being H or CH$_3$; x is 0, 1 or 2; and B$_1$, B$_2$ and B$_3$ are each taken from the group consisting of an alkylene of the type

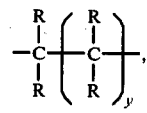

where R is H, CH$_3$ or C$_2$H$_5$ and y is either 0 to 1 to 6, cycloalkylene of the type

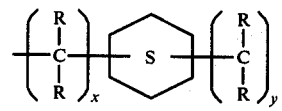

wherein R is H, CH$_3$ or C$_2$H$_5$, x=0 or 1 or 2 and y=0 or 1 or 2, oxyalkylene of the type

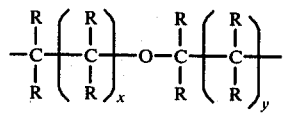

wherein R is H, CH$_3$ or C$_2$H$_5$, and x or y or both either 1, 2 or 3;

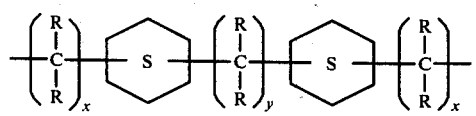

where R is H, CH$_3$ or C$_2$H$_5$, y is 0, 2 or 3, and x is 0, 1 or 2; and

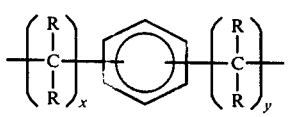

wherein R is H, CH$_3$ or C$_2$H$_5$, and x y are both either 1 or 2.

8. The composition of claim 7 wherein the base tile also includes pigment and light and heat stabilizers.

9. The composition according to claim 7 wherein the wear layer also includes pigment.

10. A continuous process for producing an improved vinyl tile comprising:
(a) calendering a uniform mix comprising filler, vinyl chloride polymer and plasticizer to form a continuous vinyl sheet having a thickness of from about 1/16" to about ⅛", said continuous sheet being discharged from the calendering zone at a travel rate of at least about 80 ft./min.;
(b) coating the thus-formed continuous vinyl sheet traveling essentially at said travel rate with a layer between about 1 and about 5 mils thick of a substantially solvent free fluid coating composition comprising urethane compound having at least two photo-polymerizable ethylenically unsaturated groups of the general structure:

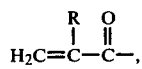

where R is either H or CH₃, said layer of coating composition being capable of curing upon exposure to ultraviolet light to form a hard, clear layer adherent to said vinyl sheet;
(c) exposing the thus-coated sheet traveling essentially at said rate of at least about 80 ft/min. to ultraviolet light having wavelengths within the range of from about 2500 Å to about 4000 Å at a temperature of from about 100° F. to about 220° F., the radiation intensity level being sufficient to initiate the desired curing of the coating within an ultraviolet exposure time of from about 0.2 sec. to about 15 sec. and
(d) passing the thus-treated sheet traveling essentially at said rate to a cutting zone and therein cutting the thus-coated and treated sheet at a temperature of not less than about 120° F. to form individual tiles having a clear wear layer thereon.

11. The process of claim 10 in which said continuous sheet discharged from the calendering zone and thereafter coated and irradiation-treated travels at a rate of from about 125 ft./min. to about 175 ft./min.

12. The process of claim 11 in which the sheet is cut into individual tiles at not less than about 130° F. and the ultraviolet exposure temperature is between about 130° and about 180° F.

13. The process of claim 10 in which said fluid coating composition contains a photosensitizer and vinyl monomer, said vinyl monomer being copolymerizable under ultraviolet radiation with said urethane compound, said vinyl monomer being sufficiently stable to prevent gelation with said urethane compound prior to exposure to said ultraviolet radiation, and said vinyl monomer being present in an amount within the range of from about 15% to about 60% by weight based on the total weight of said urethane compound and said vinyl monomer.

14. The process of claim 13 in which the vinyl chloride polymer comprises vinyl chloride/vinyl acetate copolymer having a ratio of vinyl chloride to vinyl acetate units between about 4 to 1 and about 10 to 1.

15. An improved vinyl tile comprising:
(a) thermoplastic base tile comprising filler, vinyl chloride, polymer and plasticizer; and
(b) a clear, durable wear layer adhering to the surface of said base tile and having a thickness of from about 1 to about 5 mils, said wear layer comprising urethane compound photo-polymerized by an exposure to ultraviolet light at from about 110° F. to about 220° F. for from about 0.2 to about 15 sec, said wear layer being photopolymerized from a fluid coating composition comprising urethane compound having at least two photo-polymerizable ethylenically unsaturated groups of the general structure:

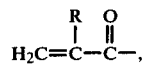

where R is either H or CH₃.

16. The composition of claim 15 in which said wear layer includes a photosensitizer and vinyl monomer copolymerized with said urethane compound, said vinyl monomer comprising from about 15% to about 60% by weight of said product based on the total weight of said urethane compound and said vinyl monomer.

17. The tile of claim 16 wherein the base tile also includes pigment and light and heat stabilizers.

18. The tile according to claim 16 wherein the wear layer also includes pigment.

19. Process according to claim 5 wherein the volatility of the solvent free fluid coating composition is between about 0.05 and about 1.0%.

20. Process according to claim 19 wherein the viscosity of said coating composition is between about 1,00 and about 3,000 centipoises at 77° F.

21. Tile according to claim 7 wherein the fluid coating composition has a volatility between about 0.05 and about 1.0% and a viscosity between about 1,000 and 3,000 centipoises at 77° F.

* * * * *

UNITED STATES PATENT AND TRADEMARK OFFICE
CERTIFICATE OF CORRECTION

PATENT NO. : 4,180,615

DATED : December 25, 1979

INVENTOR(S) : Phillip S. Bettoli

It is certified that error appears in the above-identified patent and that said Letters Patent are hereby corrected as shown below:

The inventor name should read --Phillip S. Bettoli--. Column 1, line 66, after "0.2" cancel "1". Column 7, lines 63-65, column 16, lines 53-55 and column 18, lines 17-19, the left hand formula should read:

$$H_2C=C-C-O-$$
$$\phantom{H_2C=}\overset{R}{|}\ \overset{O}{\|}$$

Column 8, line 8, column 16, line 67 and column 18, line 30, "0 to 1 to 6" should read --0 or 1 to 6 --. Column 8, lines 11-14, column 17, lines 3-6 and column 18, lines 34-37, the portion of the formula reading

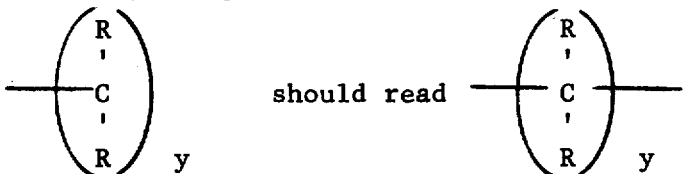

should read

Column 11, line 52, after "higher", insert --,such as up to about 60% by weight,--. Table III, show color under heading "G" as --pale yellow--; in title of table, "DIOLS" should read --TILES--. Column 16, line 17, after "sec." insert --;--. Column 8, line 43, column 17, line 39 and column 18, line 65, after "x", insert --and--. Column 17, line 47 and column 20, line 17, after "chloride" cancel the comma. Column 19, line 31, "100°F" should read --110°F--. Column 20, line 32, "composition" should read --tile--; line 46, "1,00" should read --1,000--. Column 18, line 56, after "0," insert --1,--.

Signed and Sealed this

Eighth Day of April 1980

[SEAL]

Attest:

SIDNEY A. DIAMOND

Attesting Officer    Commissioner of Patents and Trademarks